(12) United States Patent
Updegrove

(10) Patent No.: US 6,233,376 B1
(45) Date of Patent: May 15, 2001

(54) EMBEDDED FIBER OPTIC CIRCUIT BOARDS AND INTEGRATED CIRCUITS

(75) Inventor: Darryl G. Updegrove, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/317,075

(22) Filed: May 18, 1999

(51) Int. Cl.[7] ........................................ G02B 6/12
(52) U.S. Cl. .................. 385/14; 385/15; 385/50; 385/89; 385/135
(58) Field of Search ................. 385/14, 15, 89, 385/90, 91, 92, 50, 135

(56) References Cited

U.S. PATENT DOCUMENTS

| | | | |
|---|---|---|---|
| 3,777,154 | * 12/1973 | Lindsey | 250/227 |
| 4,597,631 | * 7/1986 | Flores | 350/96.2 |
| 4,758,063 | * 7/1988 | Konechny, Jr. | 350/96.2 |
| 5,371,820 | * 12/1994 | Welbourn et al. | 385/76 |
| 5,864,642 | * 1/1999 | Chun et al. | 385/14 |
| 5,883,998 | * 3/1999 | Stevens et al. | 385/134 |
| 5,980,312 | * 11/1999 | Chapman et al. | 439/540.1 |
| 5,995,262 | * 11/1999 | Hirota et al. | 359/163 |
| 6,005,991 | * 12/1999 | Knasel | 385/14 |
| 6,105,088 | * 8/2000 | Pascale et al. | 710/100 |

\* cited by examiner

*Primary Examiner*—Hemang Sanghavi
*Assistant Examiner*—Omar Rojas
(74) *Attorney, Agent, or Firm*—Harvey A. Gilbert

(57) ABSTRACT

A circuit board has optical fibers embedded in at least one layer for optical transmission of data at high speed, digital signal rates and electrically conductive strips in other layers to provide for conventional data signals and power for optoelectronic and electronic integrated circuits (IC). Optical fibers connect to optoelectronic IC's, off board IC's, circuit boards and conductors to reduce high speed digital signal latency and increase signal bandwidth/throughput. Optical fibers are used within printed circuit boards, integrated circuits, circuit board connectors, and backplane connectors to interface printed circuit boards and backplane.

7 Claims, 3 Drawing Sheets

EMBEDDED FIBER OPTIC CIRCUIT BOARDS AND INTEGRATED CIRCUITS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Contemporary printed circuit boards have embedded circuits or patterned traces made from layers of copper. The traces typically connect electrical components, cables, and other printed circuit boards through electrical connectors, and create functional circuits transmitting data as electrical signals. These traces and the circuits and connections they create do not, of course, pass optical data signals. A main limitation of this transmission method is that electrical signals experience a phenomenon known as "propagation delay," which is the length of time it takes for a signal to travel from its starting location to its final location.

Consequently, current technology is limited to such an extent that modem Central Processing Units (CPUs) are placing more components directly on the CPU itself, because the propagation delay is limiting the CPU speed to unacceptably slow rates. As a result, internal CPU backplanes are required to allow for increases in CPU power and efficiency. Circuit card backplanes having various printed circuit boards that plug into a central circuit board for inter-circuit board communication are also reaching their maximum speeds, and require special cables and alternate signal routes to bypass the backplanes.

In addition, data transmissions via conventional electrical signals also reach bandwidth limitations, which are maximum amounts of data that can be carried over a particular signal path, cable, or electrical bus. Furthermore, many conventional electrical transmissions are fed through electrical connectors that may experience "contact corrosion resistance," which is the increased electrical resistance due to corrosion that can form at connection points. Although gold-plated contacts reduce this, they are not totally impervious to its occurrence.

Thus, in accordance with this inventive concept, a need has been recognized in the state of the art for a circuit board that utilizes copper or other metallic strips for conventional data and power signals and embedded fiber optic conductors for optical transmission of data at high speed, digital signal rates to reduce signal latency and increase signal bandwidth/throughput.

SUMMARY OF THE INVENTION

The present invention provides a printed circuit board that has embedded optical fibers to transmit optical data signals between optoelectronic components in interfacing integrated circuits and further has interfacing electrical conductors to transmit electrical data signals and power.

An object of the invention is to utilize optical fibers directly within printed circuit boards and integrated circuits that interface with printed circuit boards.

Another object of the invention is to provide embedded optical fibers in printed circuit boards, integrated circuits, and connectors/sockets for printed circuit boards and integrated circuits.

Another object of the invention is to provide optic fibers directly within printed circuit boards to transmit digital optic (light) signals between electrical components that are capable of emitting and receiving these signals.

Another object of the invention is to provide printed circuit boards utilizing optical connections to other circuit boards, cables, and individual components that do not require optical-to-electrical conversion and coupling to standard electrical conductors.

Another object of the invention is to utilize fiber optics directly within printed circuit boards and integrated circuits that have onboard converters from electrical to optic signals, and vice versa.

Another object of the invention is to provide embedded optical fibers in printed circuit boards and integrated circuits to improve speed of transmission of digital data signals.

Another object of the invention is to provide embedded optical fibers in printed circuit boards and integrated circuits to decrease propagation delay of digital data signals.

Another object of the invention is to provide embedded optical fibers in printed circuit boards and integrated circuits to increase bandwidths of signal transmission.

Another object of the invention is to provide embedded optical fibers in printed circuit boards and integrated circuits to eliminate the problems associated with poor electrical connections between electrical connector contacts due to corrosion of the contacts.

These and other objects of the invention will become more readily apparent from the ensuing specification when taken in conjunction with the appended claims.

DESCRIPTION OF THE PREFERRED EMBODIMENTS

Printed circuit boards have patterns of conductive strips deposited, printed, or etched onto an insulating board. Several boards may be grouped into assemblies that include many printed components and integrated circuits to electronically process data. However, because of the time and bandwidth needed to transmit electric signals on conductive strips, the design of these conventional integrated circuit board assemblies appears to have reached practical limits.

Many limitations of conventional circuit boards using conductive strips for electronic data transmission are overcome by this invention including optical fibers and other waveguides in layers of the printed circuit boards. Optical fibers allow transmission of data signals as light in circuit boards and associated components in much larger bandwidths at the speed of light (about 2.997925 meters per second) to allow interfacing of components with optical fibers carrying high bandwidth, multiplexed optical data signals over long distances.

Figure 1:
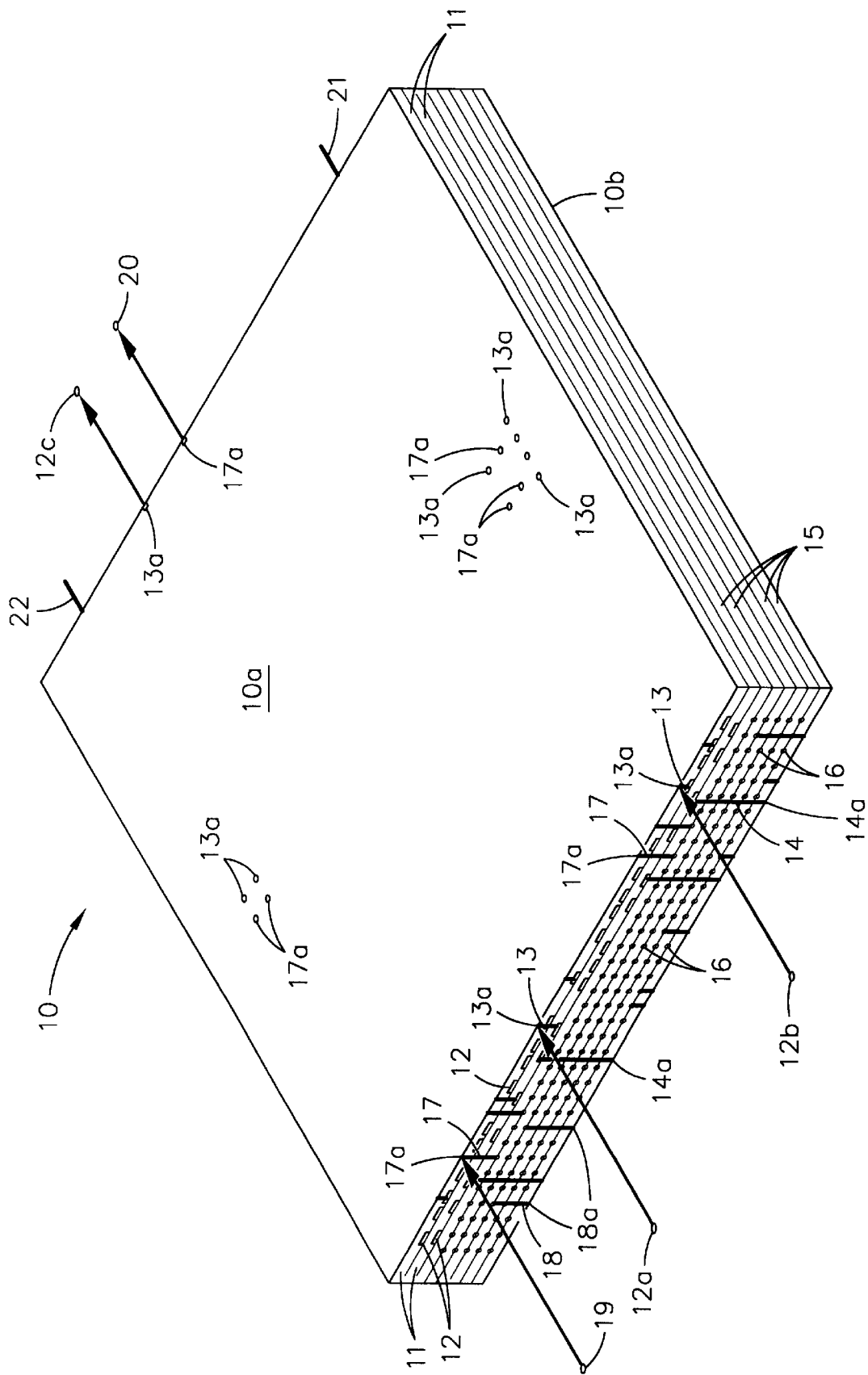
FIG. 1 is a cutaway view of a circuit board having different layers of embedded optical fibers for optical data transmission and electrical conductors for circuit power and electrical data signal transmission that allow the optical fibers and electrical conductors access to the top and bottom surface areas of the printed circuit board.

Referring to FIG. 1, circuit board 10 has a plurality of insulating layers 11 mounting electrically conductive strips 12 that may be arranged in patterns to transmit electrical power and electrical data signals from sources 12a and 12b to interconnected components, (not shown) and to at least one output 12c. Insulating layers 15 are disposed adjacent to or interleaved with layers 11 to transmit optical data signals through optical fibers, or waveguides, 16 to optoelectronic and/or electronic integrated circuits (not shown), at least one optical data source 19, optical output terminal 20, optical circuit board connector 21, and/or backplane connector 22.

The side cutaway view of juxtaposed insulating layers 11 and 16 in circuit board 10, shows optical fibers 16 in insulating layers 15 that have the capability to bidirectionally transmit different optical signals simultaneously without any mutual interference, and standard electrical conductors, or electrically conductive strips 12 in adjacent layers 11 that have the capability to simultaneously, bidirectionally transmit circuit power and multiple electrical data signals. Optical fibers 16 in different layers 15 are provided with optically transmitting portions 17 and 18 that extend in substantially right angles from individual fibers 16 to ends 17a and 18a flush with top and bottom surfaces 10a and 10b of circuit board 10, respectively. Conductive strips 12 in different layers 11 have electrically conducting portions 13 and 14 that extend in substantially right angles from individual conductive strips 12 to ends 13a and 14a flush with top and bottom surfaces 10a and 10b of circuit board 10, respectively.

Figure 3:
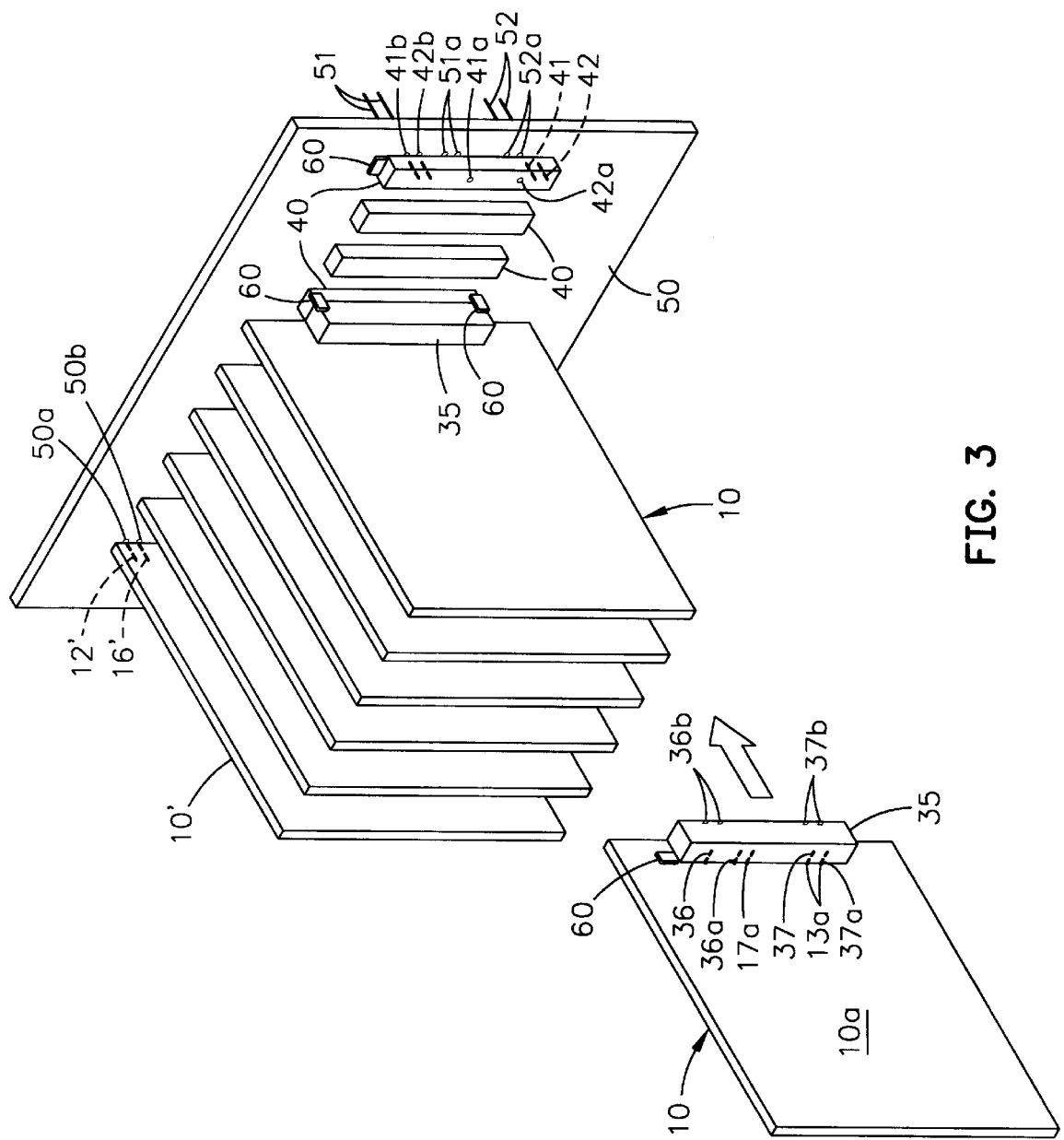
FIG. 3 shows a circuit board for a fiber optic backplane that has a circuit board connector interfacing a backplane connector and/or optical fibers directly terminating at the edge of the circuit board to interface the fibers of the circuit board with fibers in the backplane.

Portions 17 and 18 from layers 15 and portions 13 and 14 from layers 11 allow optical fibers 16 and conductive strips 12 to separately access discreet areas of the top and bottom surfaces of printed circuit board 10. Some of ends 17a, 18a and ends 13a, 14a are shown at or near the edge of circuit board 10, and other ones of ends 17a and 13a extend through top surface 10a inside of the edges of circuit board 10 to interface with other electronic and optoelectronic components through, for example, integrated circuit sockets, as will be explained below. Although not shown in the drawings, it is to be understood that other ones of ends 18a and 14a may extend to bottom surface 10b at or near the edges of circuit board 10 and/or inside of the edges of circuit board 10 and be operatively coupled to other integrated circuits that are to be joined to the bottom of circuit board 10. Furthermore, circuit board 10' in FIG. 3 shows ends 16' of optical fibers 16 and ends 12' of conductive strips 12 that may interface directly with optical connectors 50a and electrical connectors 50b of backplane 50. More such direct connections between 10' and 50 can be made across the thickness of circuit board 10.

Figure 2:
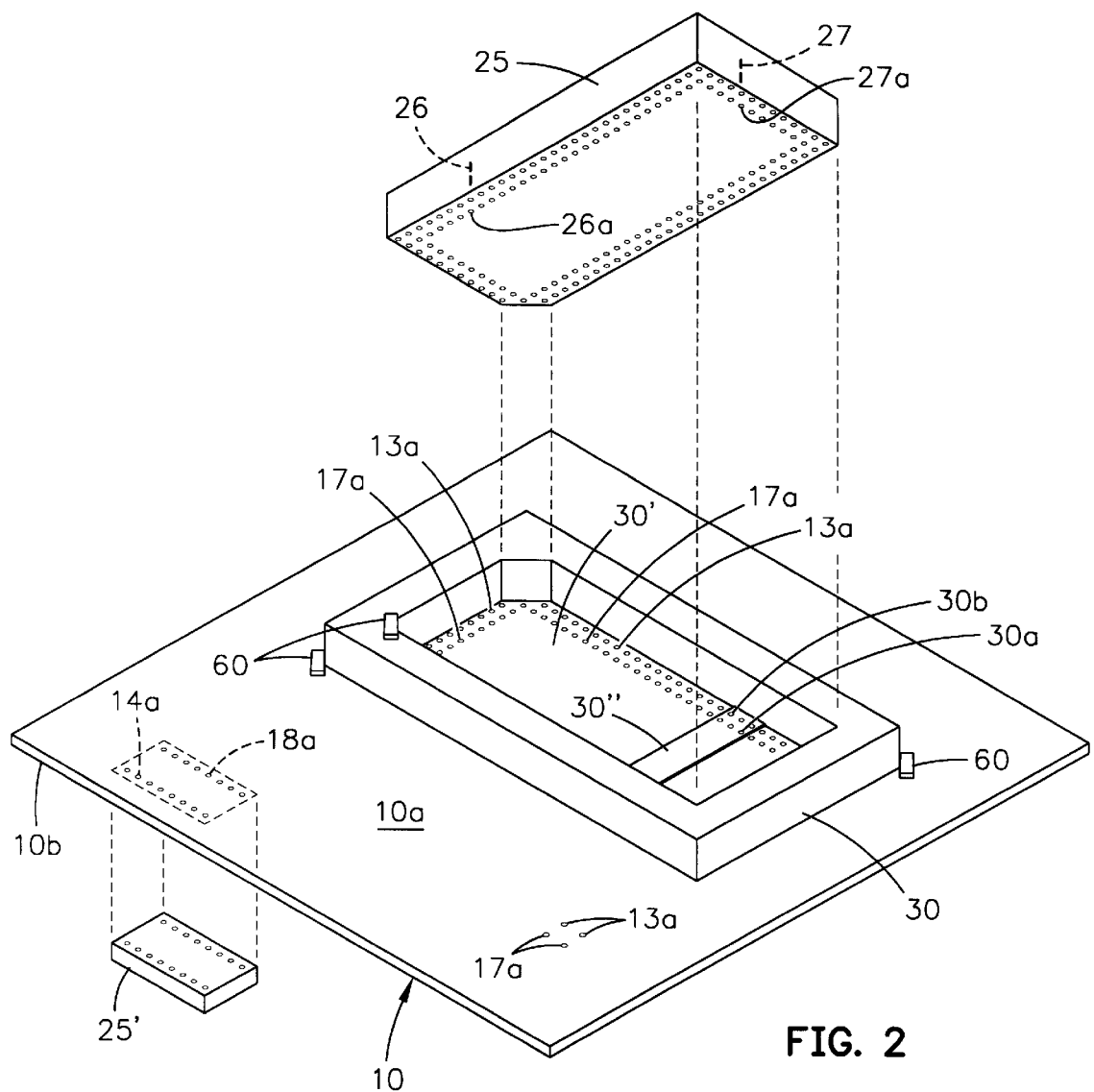
FIG. 2 shows an integrated circuit to be fitted and seated within an integrated circuit socket to interface a circuit board, and the integrated circuit is above the socket and rotated 90 degrees to show ends of electrical conductors and optical fibers on its bottom to electrically and optically couple with correspondingly disposed ends of electrical conductors and optical fibers embedded in the circuit board.

FIG. 2 shows circuit board 10 adapted to interface with integrated circuit 25 which may include many optoelectronic and/or electronic components to perform a wide variety of optical and/or electronic processing. Integrated circuit 25 is depicted as removed from cavity 30' of integrated circuit socket 30 and rotated about ninety degrees to show ends 26a and 27a of its fiber optics 26 and lengths of electrical conductors 27. Fiber optics 26 extend from optoelectronic components in integrated circuit 25 and terminate in ends 26a that may be flush with the bottom of integrated circuit 25. When integrated circuit 25 is fitted, seated, and properly retained in cavity 30' in integrated circuit socket 30 that is mounted on surface 10a of circuit board 10, ends 26a of fiber optics 26 are aligned to abut with correspondingly disposed ends 17a of optical fiber portions 17 or small lengths of interfacing optical fibers 30a built into span 30" across socket 30. These butt-type joints transmit optic data signals to and from circuit board 10. An optical gel, or other suitable optical coupling can be used to enhance transmission.

Integrated circuit 25 also has ends 27a of lengths of electrical conductors 27 that spatially correspond with certain ones of ends 13a of electrically conductive portions 13 on surface 10a of circuit board 10. When integrated circuit 25 is fitted, seated and properly retained in cavity 30' of integrated circuit socket 30 on surface 10a of circuit board 10, ends 27a of electrically conductive strips 27 are aligned to contact correspondingly disposed ends 13a of electrically conductive portions 13. Electrical contact is assured since ends 27a are flush with the bottom of integrated circuit 25 or they may bulge slightly outwardly from it. Integrated circuit socket 30 may have small lengths of interfacing electrical conductor 30b built into span 30" across socket 30 to further assure electrical interconnection between integrated circuit 25 and circuit board 10. A suitable conductive compound can be applied at points of contact to aid electrical contact.

Thus, socket 30 provides for both electrical and optic connections, so that both types of signals (as well as electrical power for the integrated circuit) can be transmitted. Couplers 60 can be included at the junction of circuit board 10 and socket 30 and at the junction of socket 30 and integrated circuit 25 to mechanically hold them together to ensure optical and electrical connections. Other ones of ends 14a of electrically conductive portions 14 and ends 18a of optically transmitting portions 18 of optical fibers 16 in circuit board 10 may extend to bottom surface 10b inside of the edges of circuit board 10 and be operatively coupled to other integrated circuits, such as integrated circuit 25' on the bottom of circuit board 10.

FIG. 3 shows circuit board 10 provided with circuit board connector 35. Circuit board connector 35 has embedded electrical and/or optical fibers appropriately arranged to interface with circuit board 10 and transmit and receive electrical and optical signals to and from it. Circuit board connector 35 has an arrangement of ends 36a of electrically conductive strips 36 and ends 37a of connector optical fibers 37 that correspond to interface and interconnect with some electrically conductive ends 13a and some of optical fiber ends 17a on surface 10a of circuit board 10. Electrically conductive conductor strips 36 and connector optical fibers 37 embedded in circuit board connector 35 make an essentially right-angled turn and respectively terminate in ends 36b and 37b at the back surface of circuit board connector 35. Ends 36b and 37b are flush with, or, in the case of electrically conductive ends 36b, are slightly bulging above the back surface of circuit board connector 35.

Backplane connector 40 has backplane connector electrical conductors 41 and/or backplane connector optical fibers 42 at or near its surfaces or further embedded therein that reach from ends 41a of electrical conductors 41 and ends 42a of optical fibers 42 at the front surface of backplane connector 40 to ends 41b and 42b at its back surface. Ends 41a and 42a are flush with, or, in the case of electrically conductive ends 41b, may be slightly bulging above the back surface of backplane connector 40 and arranged to bidirectionally conduct optical and electrical data signals through appropriately disposed abutting ends 36b and 37b of circuit board connector 35. Ends 41b and 42b are flush with, or, in the case of electrically conductive ends 41b, may be bulging above the back surface of backplane connector 40 to abut the front surface of backplane 50.

Backplane 50 has electrical conductors 51 and/or optical fibers 52 embedded therein to extend to other interfacing structure or remote networks. Ends 51a and 52a of electrical conductors 51 and optical fibers 52 are flush with, or, in the case of electrically conductive ends 51a, may be slightly raised above the front surface of backplane 50 to transmit and receive optical and electric data signals via abutting ends 41b of electrical conductors 41 and ends 42a of optical fibers 42 in backplane connector 40. Circuit board 10 and circuit board connector 35, circuit board connector 35 and backplane connector 40, and backplane connector 40 and backplane 50 may be securely held together in their abutting relationships along their junctions by one or more couplers 60, such as well known bolt-and-socket types. Details of couplers 60 to secure the circuit boards, connectors, and backplane are not shown since many current standards in this area are well known. These connections assure that electrical and optical data signals can bidirectionally pass among elements 10, 35, 40, 50, and other circuits.

Only a few of ends 13a, 17a, 26a, 27a, 26b, 27b, 50a, and 50b that might be along the edges of circuit board 10, circuit board connector 35, backplane connector 40, and backplane 50 are shown. Many additional ends of embedded electrical and optical data conductors may be disposed across abutting surfaces of circuit board 10, circuit board connector 35, backplane connector 40, and backplane 50 to transmit optical and electrical data signals, and electrical power. Elements 10, 35, 40, and 50 may also have integrated circuits for more optoelectronic and/or electronic processing capabilities.

This interface between circuit board 10, circuit board connector 35, backplane connector 40, and backplane 50 permits direct coupling from circuit board 10 to fiber optic waveguides 51 embedded in backplane 50 and helps reduce "rats-nest" like interconnections that are common in many conventional backplane interconnections. Optionally, if backplane connector 40 is not needed, ends 37b of optical fibers 37 and ends 36b of electrical conductors 36 of circuit board connector 35 could be directly interfaced with matingfibers 51a and conductors 52a on 50.

Embedded fiber optics in circuit boards 10 and integrated circuits 25 improve speed of transmission of data signals, decrease propagation delay of digital signals, increase bandwidths of data signal transmission, and eliminate poor contacts at connectors due to increased resistance attributed to corrosion of contacts. Optical fibers are embedded directly into circuit boards, integrated circuits, and connectors/sockets for improved operation by reducing signal latency and increasing signal bandwidth/throughput.

The disclosed components and their arrangements as disclosed herein all contribute to the novel features of this invention. Many diverse patterns of optical fibers and electrical conductors on one or more layers might be adapted to support a host of different integrated components performing widely diverse functions from data storage to mechanical operations without departing from the scope of this invention. In addition to the disclosed optical and electrical ends that abut for optical and electrical connections, other known optical and electrical couplers could be used within the scope of this invention. For examples, extensions of the optical fibers and electrical conductors could fit into mating optically or electrically conducting bores, or mating plug-and-socket assemblies might be used, or connectors or pin-and-receptacle connectors might by employed at surfaces of elements 10, 25, 35, 40, and 50.

Having the teachings of this invention in mind, modifications and alternate embodiments of this invention may be adapted to many other data processing applications. Therefore, the invention as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. An apparatus for coupling optical and electrical data signals comprising:

a circuit board including a plurality of first insulating layers each having optical fibers embedded therein to transmit optical data signals and a plurality of second insulating layers each having electrically conductive strips and electrical power conductors to transmit electrical data signals and electrical power respectively, said plurality of first and second insulating layers being flat and arranged in a side-by-side stacked relationship with respect to each other, said optical fibers being provided with optically transmitting portions extending in substantially right angles through insulating layers to ends flush with top and bottom surfaces of said circuit board, and said electrically conductive strips and electrical power conductors being provided with electrically conducting portions extending in substantially right angles through insulating layers to ends flush with said top and bottom surfaces of said circuit board;

at least one integrated circuit having at least one optoelectronic component optically connected to lengths of fiber optics laterally extending therefrom to at least one of said ends of said optically transmitting portions and electrically connected to lengths of electrical conductors laterally extending therefrom to at least one of said ends of said electrically conducting portions; and an integrated circuit socket disposed on either of said top and bottom surfaces of said circuit board, said socket having a cavity sized to fit and seat said integrated circuit therein to correspondingly align ends of said lengths of fiber optics and lengths of electrical conductors with said ends of said optically transmitting portions and electrically conducting portions, respectively to thereby permit optical transmission of optical data, electrical transmission of electrical data, and electrical transmission of electrical power between said circuit board and said integrated circuit.

2. An apparatus according to claim 1 further comprising:

a circuit board connector on said circuit board having connector optical fibers embedded therein to transmit optical data signals, and electrically conductive connector strips to transmit electrical data and power signals therebetween.

3. An apparatus according to claim 2 wherein said ends of said optically transmitting portions and electrically conducting portions are at either of said top and bottom surfaces of said circuit board, and said connector optical fibers and electrically conductive connector strips of said circuit board connector have ends at a surface of said circuit board connector, individual ones of said ends at either of said top and bottom surfaces of said circuit board and individual ones of said ends at said surface of said circuit board connector board are aligned in corresponding pairs to thereby permit optical transmission of optical data, electrical transmission of electrical data, and electrical transmission of electrical power between said circuit board and said circuit board connector.

4. An apparatus according to claim 3 further including:
a backplane connector coupled to said circuit board connector having backplane connector optical fibers embedded therein to transmit optical data signals, and backplane connector electrical conductors to transmit electrical data and power signals therebetween.

5. An apparatus according to claim 4 in which said connector optical fibers and electrically conductive connector strips of said circuit board connector have ends at a surface of said circuit board connector, and said backplane connector optical fibers and backplane connector electrical conductors of said backplane connector have ends at a surface of said backplane connector, individual ones of said ends at said surface of said circuit board connector and individual ones of said ends at said surface of said backplane connector are aligned in corresponding pairs to thereby permit optical transmission of optical data, electrical transmission of electrical data, and electrical transmission of electrical power between said circuit board connector and said backplane connector.

6. An apparatus according to claim 5 further including:
a backplane coupled to said backplane connector having backplane optical fibers embedded therein to transmit optical data signals, and backplane electrical conductors to transmit electrical data and power signals therebetween.

7. An apparatus according to claim 6 in which said backplane connector optical fibers and backplane connector electrical conductors of said backplane connector have ends at a surface of said backplane connector, and said backplane optical fibers and backplane electrical conductors of said backplane have ends at a surface of said backplane, individual ones of said ends at said surface of said backplane connector and individual ones of said ends at said surface of said backplane are aligned in corresponding pairs to thereby permit optical transmission of optical data, electrical transmission of electrical data, and electrical transmission of electrical power between said backplane connector and said backplane.

\* \* \* \* \*